United States Patent
Thompson et al.

(12) 
(10) Patent No.: US 7,281,089 B2
(45) Date of Patent: *Oct. 9, 2007

(54) SYSTEM AND METHOD FOR REORGANIZING DATA IN A RAID STORAGE SYSTEM

(75) Inventors: Mark J. Thompson, Spring, TX (US); Stephen M. Schultz, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 273 days.

This patent is subject to a terminal disclaimer.

(21) Appl. No.: 11/068,550

(22) Filed: Feb. 28, 2005

(65) Prior Publication Data

US 2005/0166085 A1    Jul. 28, 2005

(51) Int. Cl.
*G06F 12/00* (2006.01)
*G06F 13/00* (2006.01)

(52) U.S. Cl. .................. 711/114; 711/112; 711/154; 714/8

(58) Field of Classification Search ............. 711/100, 711/112, 114, 154, 202; 714/8, 20, 763, 714/766

See application file for complete search history.

(56) References Cited

U.S. PATENT DOCUMENTS

| | | | |
|---|---|---|---|
| 5,101,492 A | 3/1992 | Schultz et al. | |
| 5,130,992 A | 7/1992 | Frey et al. | |
| 5,271,012 A | 12/1993 | Blaum et al. | |
| 5,774,643 A | 6/1998 | Lubbers et al. | |
| 5,809,224 A | 9/1998 | Schultz et al. | |
| 5,961,652 A | 10/1999 | Thompson | |
| 6,058,489 A | 5/2000 | Schultz et al. | |
| 6,161,192 A | 12/2000 | Lubbers et al. | |
| 6,269,453 B1 | 7/2001 | Krantz | |
| 6,499,039 B1 | 12/2002 | Venkatesh et al. | |
| 6,928,513 B2 * | 8/2005 | Lubbers et al. ............. | 711/114 |
| 2002/0095616 A1 | 7/2002 | Busser | |
| 2003/0145270 A1 | 7/2003 | Holt | |
| 2003/0163777 A1 | 8/2003 | Holt | |
| 2003/0188229 A1 * | 10/2003 | Lubbers et al. ............... | 714/47 |

* cited by examiner

*Primary Examiner*—Tuan V. Thai

(57) ABSTRACT

Storage controllers and related methods of operation are described. One method tracks storage access operations to a logical disk. The method persistently identifies storage blocks that have been accessed. Responsive to the identifying, the method selectively skips subsequent operations to storage blocks that have not been accessed.

17 Claims, 5 Drawing Sheets

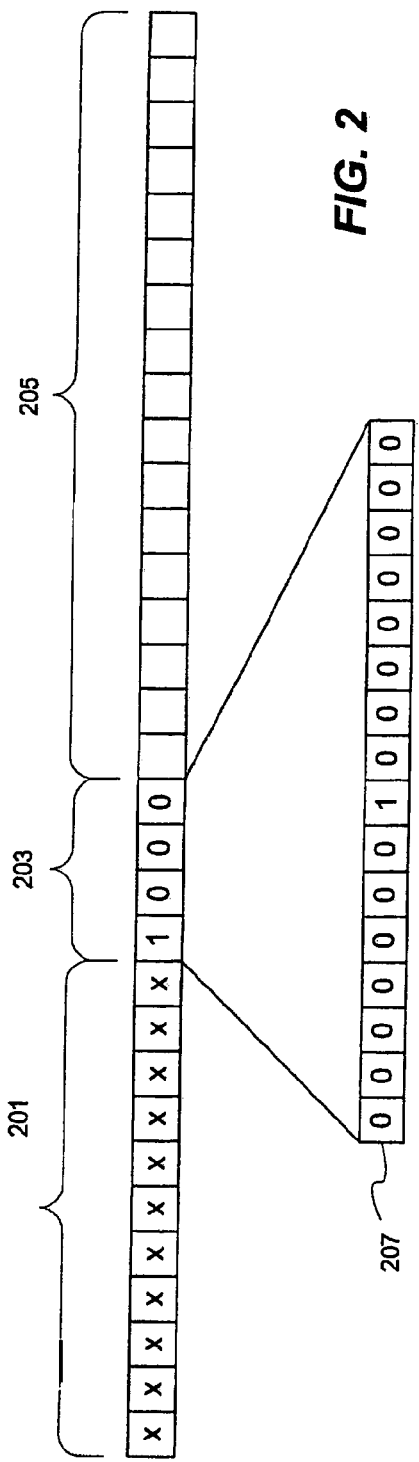
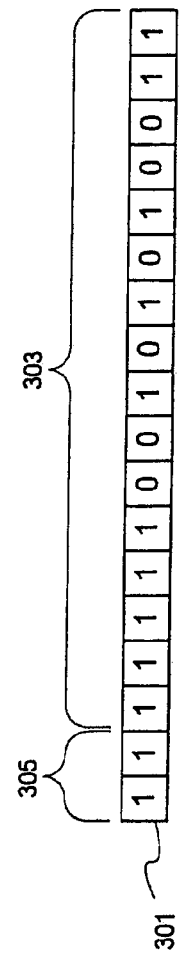
FIG. 2
FIG. 3
FIG. 4

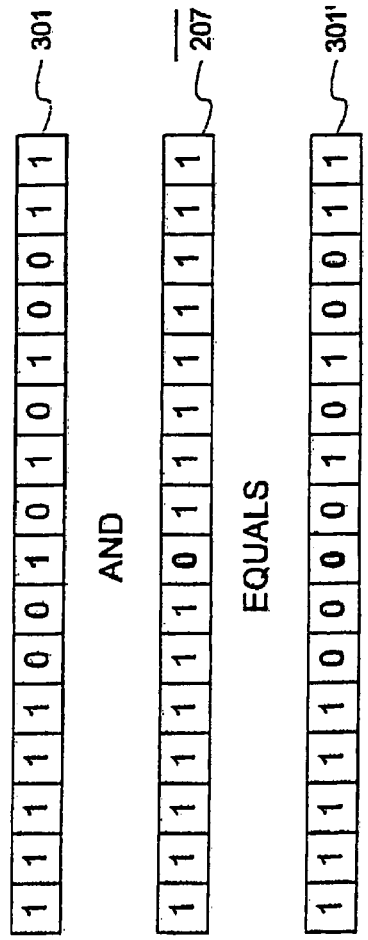
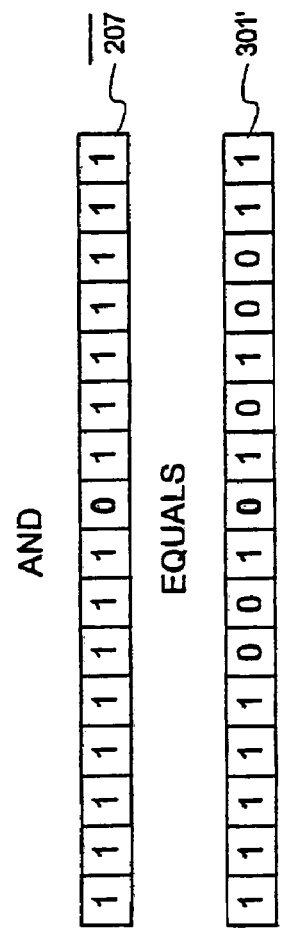
*FIG. 5*
*FIG. 6*

SYSTEM AND METHOD FOR REORGANIZING DATA IN A RAID STORAGE SYSTEM

PRIORITY

The present application is related to, and depends from, a co-pending application titled "System and Method for Reorganizing Data in a Raid Storage System", filed on Jun. 24, 2002, and having application Ser. No. 10/179,727.

BACKGROUND OF THE INVENTION

1. Field of the Invention

The present invention relates, in general, to redundant data storage, and, more particularly, to software, systems, controllers and methods for reorganizing data in a RAID (redundant array of independent disks) system to improve performance during rebuild, capacity expansion, and migration operations.

2. Relevant Background

Recent years have seen a proliferation of computers and storage subsystems. Early computer systems relied heavily on direct-attached storage (DAS) consisting of one or more disk drives coupled to a system bus. More recently, network attached storage (NAS) and storage area network (SAN) technology are used to provide storage with greater capacity, higher reliability, and higher availability.

RAID (Redundant Array of Independent/Inexpensive Disks) is an organization of data on a plurality of disks to achieve varying levels of availability and performance. The plurality of disks used to implement any particular RAID volume may be directly attached to a single computer, or implemented in network-connected drives that are accessible by one or more computers. In general, RAID uses combinations of multiple drives to obtain performance, capacity and reliability that exceeds that of a single large drive. The array of drives appear to the host computer as a single logical drive. Several levels of RAID architectures have been defined where each level provides a different level of fault tolerance, performance and data availability.

RAID storage systems can be implemented in hardware or software. In a hardware implementation the RAID algorithms are built into a controller that connects to the host computer's I/O bus. In a software implementation the RAID algorithms are incorporated into software that runs on the main processor of the host computer in conjunction with the operating system. In network systems, a controller is implemented within a storage network, or as a gateway to a storage network, and the RAID algorithms operate in the hardware/software of the network RAID controller so as to relieve the host computer of responsibility for the RAID implementation.

An important concept used by many RAID architectures is "striping" which spreads data across the disks in the array. A typical storage access request identifies a starting logical block address (LBA) and a count of the number of blocks involved in the access request. A block is the smallest unit of data that can be read or written to a disk. The data access requests are handled in segments referred to as "strips." A strip represents a quantity of data that can be accessed on a single disk. Usually a strip comprises a group of blocks, although a strip may be smaller than a single block in some systems. In other words, a strip is the unit of data interleaving for a RAID array. For example, in a four disk RAID-5 array the first strip is placed on the first disk, the second strip is placed on the second disk, the third strip is placed on the third disk, the fourth strip is placed on the fourth disk, the fifth strip is placed on the first disk and so on. This spreading of data increases performance because the multiple drives can work concurrently to service data access requests during heavy load operations.

RAID level 3 (RAID 3), RAID level 4 (RAID-4) and RAID level 5 (RAID-5) are organizations of data for an array of n+1 disks that provide enhanced performance through the use of striping and enhanced data availability through the use of parity. Each disk in the RAID array is referred to as a "member" of the array. A parity block/strip is associated with every n data blocks/strips. The data and parity information are distributed over the n+1 disks so that if a single disk fails, all of the data can be recovered. A "stripe" is the collection of parity blocks and all data blocks that contribute to it. RAID-3 and RAID-4 are systems in which data blocks are organized into strips which are interleaved among the disks and protected by parity and all of the parity, is written on a single disk. RAID-5 is a level of organization of data for a RAID array where data blocks are organized in strips which are interleaved among the disks and protected by parity and the parity information is distributed over all of the disks in the array. In general, RAID-5 provides a suitable mix of performance and protection for most applications.

The contents of each bit of the parity block is the Exclusive-OR ("XOR") of the corresponding bit in each of the n corresponding data blocks. When data blocks are written, the parity information is computed and stored in the corresponding parity block. Under normal conditions, subsequent reads can access the data blocks without any parity operations. Subsequent write operations that modify the stored data must recomputed the parity information and write to each disk that holds a block that has changed as well as the parity block.

At various times in the life of a RAID system the data and parity blocks must be moved and/or reconstructed. For example, in the event of a disk failure, the data blocks and parity blocks that were stored on the failed drive are rebuilt onto a replacement drive using the data and parity blocks on the surviving drives in a process that is referred to as re-striping the array across all drives. This is done, for example, by calculating the XOR of the contents of the parity and/or data blocks remaining on the surviving disks that contributed to the block on the failed drive. "Expansion" generally refers to adding a new member to an existing array, which requires re-striping of the data & parity. It is possible to create an entirely new array (i.e., a "RAID set") from any added members as controllers generally support multiple RAID sets. "Migration" refers to re-striping to affect a change in the fault-tolerance level or strip size, without adding any new disk members to the array.

When capacity is added to a RAID system by adding drives to an existing array, the data blocks and parity blocks must be re-striped across all drives in the array. Optionally, RAID migration to affect a change in fault-tolerance level may occur in parallel with the capacity expansion re-striping process. Migration may also be performed independently of capacity expansion to improve spindle usage in the array. Additional background information on capacity expansion and migration (collectively termed "reconfiguration") may be found in U.S. Pat. No. 6,058,489, entitled Online Disk Array Reconfiguration which is assigned to the assignee of the present invention, invented by the inventors of the present application, and which is incorporated herein by reference.

These operations are typically time consuming. While it is possible to perform these operations while the RAID system remains operational, performance and/or data protection during the rebuild, expansion, and migration processes is often impacted. In instances where the storage system must remain in a fault-tolerant state, these operations often require that the storage system be taken off line until the operations are completed. In any case, it is desirable to reduce the time required to perform rebuild, expansion, and migration operations.

Conventional systems perform these operations on each block in a volume, irrespective of whether that block contains any data and/or parity information. While this was acceptable when physical drives were relatively small, the operations can take a significant amount of time with modern hard drives that implement gigabytes of capacity. However, RAID controllers have not, until now, been able to distinguish between used and unused portions of the storage capacity. Hence, a need exists for systems, methods, controllers, and software that intelligently manage rebuild, expansion, and migration operations to reduce the time required for these operations on large physical drives.

SUMMARY OF THE INVENTION

Briefly stated, the present invention involves a method of operating a storage controller that receives data access requests containing a logical block address and a count of blocks involved in the access request. A record is generated and persistently stored indicating whether particular logical block addresses have been accessed since creation. The persistent record is subsequently accessed to enable selected operations to be skipped or aborted when the selected operations involve logical block addresses that have never been accessed.

BRIEF DESCRIPTION OF THE DRAWINGS

FIG. 2 shows an example mapping of a logical block address to a zone map in accordance with the present invention;

FIG. 3 and FIG. 4 show exemplary zone maps used in the present invention;

FIG. 5 and FIG. 6 show operations used to maintain the zone maps in accordance with the present invention;

DETAILED DESCRIPTION OF THE PREFERRED EMBODIMENTS

The present invention generally involves block-oriented storage systems, and more particularly RAID storage systems and methods for operating a RAID controller to more efficiently perform rebuild, capacity expansion, and migration operations. In general, the present invention enables storage access operations to be tracked over the life of a logical disk to persistently identify storage blocks that have been accessed. Using this information, subsequent operations that rely on previously written blocks (e.g., rebuild, capacity expansion, and migration operations) can skip address ranges that have never been used. This provides a significant performance advantage in cases where the logical drive has not been used, or is sparsely populated. While the present invention is particularly useful in disk arrays using large physical drives, it is contemplated that it will have benefit in smaller drive arrays as well.

Figure 1:
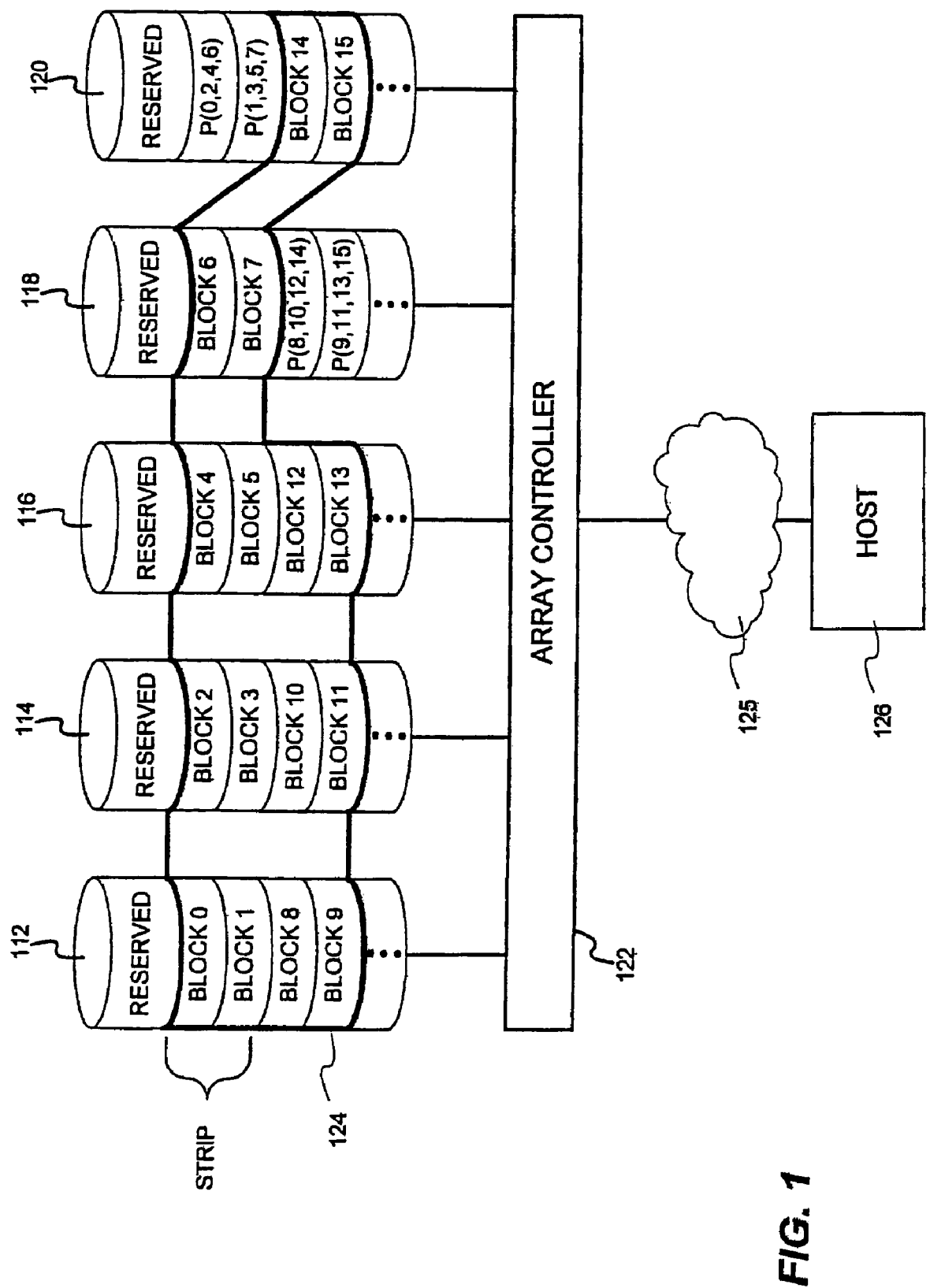
FIG. 1 illustrates the relationship between actual disk drives of a RAID array, RAID array controller and the virtual disk drive implemented by the RAID array.

FIG. 1 shows a relationship between actual member disk drives and the equivalent virtual disk drive in a RAID-5 implementation. There are five physical member disk drives: 112, 114, 116, 118 and 120. Each disk drive comprises a quantity of physical storage capacity typically accessed through interface mechanisms that are integrated with the drive (e.g., SCSI, EIDE, fibre channel and the like). The interface mechanisms map drive access requests, which typically specify an address and count of blocks involved in the access request, to physical addressing used by the drive itself to position read/write heads over particular portions of a disk surface.

Although not required to be the same size, in most applications member drives 112, 114, 116, 118 and 120 are implemented with similar capacity drives. More than one logical drive may be implemented on the same set of member disks. Also, any number of member disks may be included in a particular array.

The RAID array controller 122 manages the distributed user data blocks and parity blocks on drives 112, 114, 116, 118, and 120. User data blocks (labeled "BLOCK 0 through BLOCK 15 in FIG. 1) are presented as logical disk 124 indicated by a bold outline in FIG. 1. Host computer 126 coupled through any available communication channel or network 125 (including, for example, peripheral component interconnect or "PCI", fibre channel, SCSI, EIDE, local area network, wide area network, or other bus-based or network-based communication link) to controller 122. From the perspective of host 126, logical disk 124 appears to be a single drive comprising a plurality of logical blocks. The number of logical blocks in a logical drive 124 will vary from implementation to implementation as a logical drive may implement a few megabytes, or several gigabytes of storage. The strip size is two blocks in the implementation of FIG. 1, however, in most practical applications this would be larger. The device metadata and RAID set metadata are not shown in FIG. 1.

The array in FIG. 2 is configured with RAID-5 data protection, although any type of data protection may be used in accordance with the present invention. In the RAID-5 implementation, when data is written, a first strip fills BLOCK 0 and BLOCK 1 on physical drive 112, a second strip fills BLOCK 3 and BLOCK 4 on drive 114. BLOCK 5, 6, 7 and 8 are placed on drives 116 and 118 in a similar manner. A first parity strip comprising parity for blocks 0, 2, 4 and 6, labeled P(0,2,4,6), and a second parity block P(1,3,5,7) are computed and stored in a first parity strip in physical drive 120. Subsequent user data are allocated to BLOCK8-BLOCK15 as shown in FIG. 1, and parity blocks P(8,10,12,14) and P(9,11,13,15) computed in a similar manner. In a RAID-5 implementation parity blocks are distributed on various drives as shown in FIG. 1 whereas in a RAID-4 implementation all parity blocks would be stored on a single physical drive.

Each physical drive contains a number of reserved blocks, labeled "RESERVED" in FIG. 1. The reserved blocks are not allocated to logical block addresses of the logical disk 124. Instead, these blocks can be used to store metadata used by array controller 122 or by the drives themselves. This metadata holds various items of information that indicate the identity or name of various logical drives implemented on the disk, disk status information, logical disk size, RAID level implemented by the logical disk and the like.

In accordance with an embodiment of the present invention, metadata describing logical block address ranges that have been accessed since creation of a logical drive 124 is stored in reserved areas of one or more of disks 112, 114, 116, 118 and 120. Alternatively or in addition, this metadata can be stored in non-volatile memory within array controller 122 or otherwise accessible to array controller 122 (e.g., within one or more disk drive, or in external non-volatile memory). In a particular implementation, this metadata is implemented as a bit map where each bit represents a range of one or more logical block addresses. The state of each bit indicates whether any block within the range represented by the bit has been accessed.

In one implementation the bit indicates that a block has been written. In most cases, one is only concerned about rebuilding or migrating blocks that hold user data or parity data. In such cases, identifying blocks that have been written since creation of the logical disk is sufficient. It is contemplated that in some instances an operating system may perform a read operation to a block before that block has been written. In this case, a separate bit, preferably maintained in a separate bit map, indicates whether a block has been read since creation of logical disk 124.

FIG. 2 illustrates a logical block address that would accompany a read/write access. Logical block addresses are typically 32 bits long, which allows 2 TB of address space assuming typical 512 byte sectors. The specific values presented here are for example only as address length, address space, sector size and other related variables can be readily changed in particular implementations or by changed standards. In most cases, a logical disk 124 will implement only a portion of this available address space. Hence, a range 201 of the most significant bits of an address are not used, as indicated by an "X" in FIG. 2. In a particular implementation, the used address space (e.g., 1 Gbyte in FIG. 2) can be represented by 21 bits provided by the combination of most significant bits 203 and least significant bits 205.

The used address space is broken into an arbitrary number of "zones" in accordance with the present invention. Read/write access history is maintained on this zone basis rather than for each logical block address to improve performance and ease implementation. In the example of FIG. 2, sixteen zones are used. The sixteen zones are represented by the value of the four most significant bits 203. More or fewer zones may be used by changing the number of bits selected in group 203 (e.g., 5 bits will enable 32 zones, 3 bits will enable 8 zones). The range of LBAs represented by each zone will vary according to the total size of logical disk 124. Each logical disk 124 that is created will have a total capacity that is specified upon creation, and that capacity may be changed later. Alternatively, fixed-size zones may be used, although such an implementation would increase the complexity of mapping specific LBAs to zones.

In FIG. 2, the mapping of an LBA to one of the sixteen zones is done by decoding the four most significant bits 203. This will generate a map 207 with one bit set to indicate the zone in which the LBA is included. Map 207 is generated for each write operation and optionally for each read operation received by controller 122. Map 207 is also generated for rebuild, expansion, and migration operations handled by controller 122. Hence, it is desirable that the processing operations required to generate map 207 are computationally efficient. In practice, an operation may span multiple zones, in which case the resulting zone map may contain multiple "1" bits. The zone number for the starting LBA and for the ending LBA are determined, and these bits (and every bit in between) are then set in the resulting "decoded" zone map.

FIG. 3 illustrates a first type of zone map 301 implemented as a bit map. Bits 303 each represent the address space in one of the defined zones, and the value of the bit indicates whether the zone has been written since creation of the corresponding logical drive 124. In the illustration, a "1" indicates that a zone is "clean" in that none of the blocks included in that zone have been written, whereas a "0" indicates that the zone is "dirty" in that at least one block included in that zone has been written. The selection of which state represents clean or dirty is arbitrary and can be made to meet the needs of a particular application. Optionally, zone map 301 also includes two state bits 305 that indicate whether any rebuild operation, capacity expansion operation, or similar operations have been skipped based on the zone map values since creation of logical drive 124.

FIG. 4 illustrates a second type of zone map 401 implemented as a bit map. Bits 403 each represent the address space in one of the defined zones, and the value of the bit indicates whether the zone has been accessed by a read operation since creation of the corresponding logical drive 124. In the illustration, a "1" indicates that a zone is "clean" in that none of the blocks included in that zone have been read, whereas a "0" indicates that the zone is "dirty" in that at least one block included in that zone has been read. In some applications where it can be assured that blocks will not be read before writing, never-accessed zone map 401 may be unnecessary.

Referring now to FIG. 5 and FIG. 6, to examples of how a zone map is maintained are illustrated. When a logical disk is created, all bits in zone maps 301 and 401 are set to a clean state. When processing an operation that specifies a logical block address, the map 207 (shown in FIG. 2) is generated to indicate zones that are involved in the particular operation being handled. In FIG. 5 and FIG. 6, map 201 is logically combined with the zone map 301 or 401 using an operation "A and (NOT B)". Hence, FIG. 5 and FIG. 6 show a map 207 bar that is the inverse of map 207 shown in FIG. 2. The AND operation produces a new zone map 301'. In the specific example, of FIG. 5, the operation involves zone 8 (in bold) which has never been previously written as indicated by a "1" in the eighth bit position of map 301. The logical AND of these values produces a "0" in the eight position of the new map 301'. Hence, the map value has changed, which is the correct result as the operation involves a zone that was previously un-accessed. In contrast, an operation involving zone seven, shown by the bolded values in FIG. 6, results in the value in the seventh position of map 301' retaining its original value. This is correct in that a previously dirty zone has been accessed. The new zone map 301' is written back to the metadata storage location. This write back may be skipped if the value did not change (i.e., 301 and 301' are identical).

In the case of rebuild, capacity expansion, or other migration operations, controller 122 will process an entire logical disk 124 by repeatedly selecting a range of LBAs to process. By determining the zone value of the range of LBAs currently selected and comparing the zone value to the zone map 301 and/or 401, it can be determined whether the selected LBA range involves a previously accessed or written portion of logical disk 124. In the event that the selected LBA range has never been accessed or written the rebuild, copy, or migration operation can be skipped for that range. This will result in a significant time savings in sparsely populated logical disks.

Figure 7:
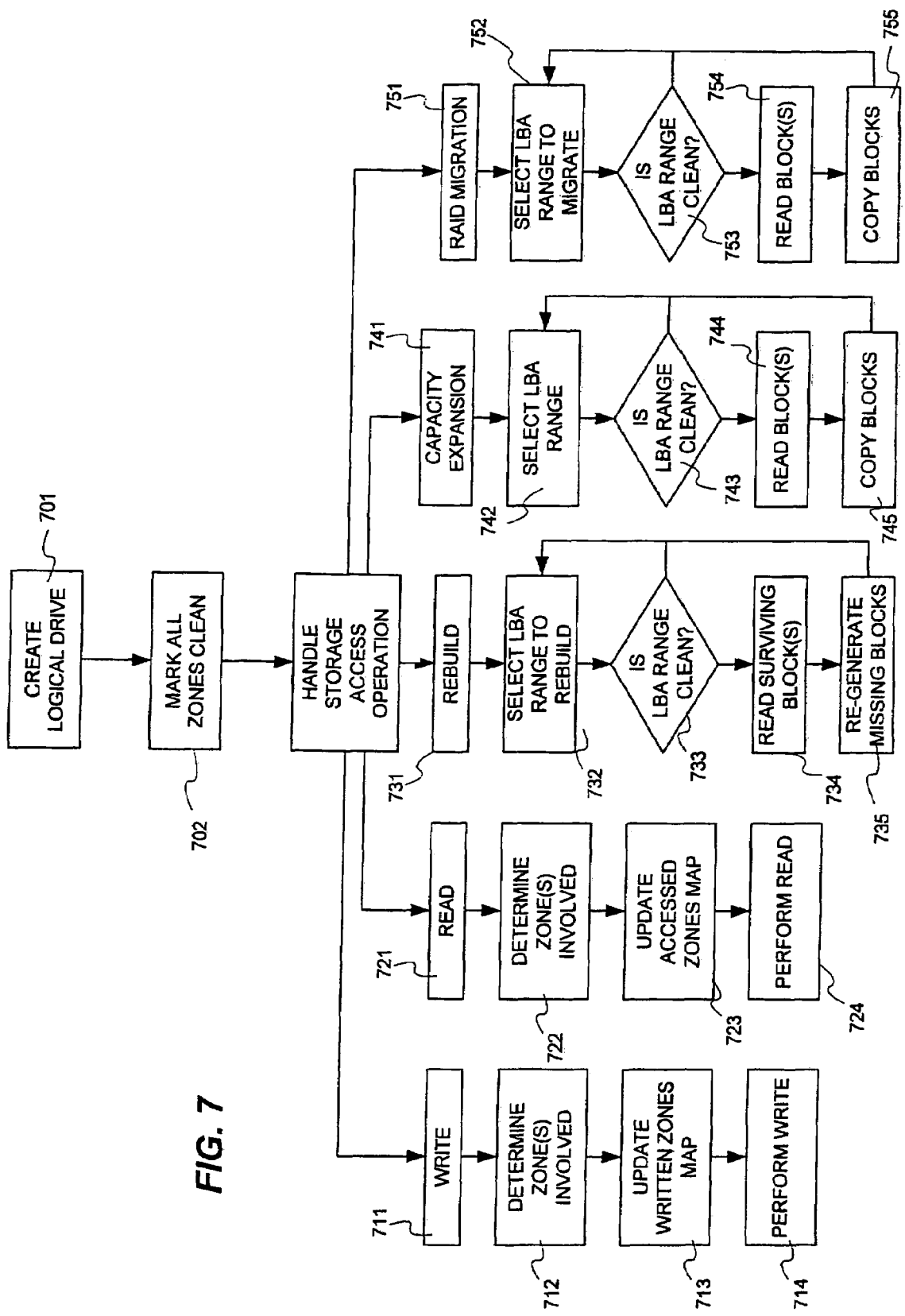
FIG. 7 shows in flow diagram form various operations involved in an implementation of the present invention.

FIG. 7 illustrates relationships between processes involved in creating and using a logical drive in accordance with the present invention. A logical drive is created in 701 by various operations that allocate physical storage to logical block addresses, create the metadata structures, and other processes that enable controller 122 to present a logical drive to a host computer system 126. The metadata structures include one or more zone maps such as maps 301 and 401 are defined. Initially, all zones are marked clean in 702, which may occur at substantially the same time as logical drive creation processes 701.

In an operational mode, storage access operations are received and an appropriate sequence of processes to handle the particular storage access request are initiated. The process sequences shown in FIG. 7 are illustrative, and not intended to reflect all of the processes that may be performed. Write operations 711 involve determining the zones involved in the write operation by analysis of the LBA range specified in the access request in operation 712. In 713, the appropriate zone map(s) are updated. After the zone map(s) is (are) updated, the write operation is performed to commit the information in the physical storage in operation 714. Operation 714 may involve writing to cache, and may be performed with write through or write back caching to meet the needs of a particular application. Read operations 721 involve determining the zones involved in the read operation by analysis of the LBA range specified in the access request in operation 722. In 723, the appropriate zone map(s) are updated if the system is configured to track read accesses in, for example, a never-read or never-accessed bit map 401. After the zone map(s) is (are) updated, the read operation is performed to obtain the information requested in the physical storage in operation 724. Operation 724 may involve reading data from cache when cache is implemented. Write operation 711 and read operation 721 are examples of fundamental storage access operations, but other operations, including read and write variations that perform similar functions, may be defined in particular applications.

While write 711 and read 721 involve operations that update and maintain the zone maps, rebuild 731, capacity expansion 741, and RAID migration operations 751 use the zone map information to improve performance. Rebuild operation 731 is initiated in response to detecting a replaced drive, for example. A range of LBAs to be rebuilt is determined in 732. The size of the range selected to be rebuilt can be adjusted to meet the needs of a particular application. In general, larger ranges will enable more efficient rebuild operation, however, resource constraints often restrict the practical size of the LBA range handled. LBA ranges are selected successively until an entire volume or logical disk is rebuilt.

In accordance with the present invention, once an LBA range is selected, the zone map(s) is(are) consulted to determine if the LBA range is clean (e.g., never written or never accessed) in operation 733. If the current LBA range belongs entirely to a single clean zone, or spans two or more clean zones, the rebuild operation can be skipped by returning to operation 732 to select the next LBA range. In the event that one or more zones involved in the LBA range are dirty, the data and/or parity blocks from surviving members are read in 734 and the portion of the logical disk corresponding to the LBA range is rebuilt and re stored in operation 735. Once the current LBA range is either skipped or rebuilt, a new LBA range is selected in 732 until the entire logical drive is rebuilt. Optionally, the current invention may be used in combination with the invention described in U.S. Pat. No. 5,961,652 entitled "Read Checking for Drive Rebuild", to further reduce rebuild time. U.S. Pat. No. 5,961,652 is assigned to the assignee of the present invention, invented by the inventors of the present invention, and incorporated herein by reference.

When new capacity is added to a RAID set in 741, e.g., by adding drives to an existing array, the data blocks and parity blocks are re-striped across all drives in the array. For example, in 742 a range of blocks to be re-striped is selected and the zone map or maps are consulted in operation 743 to determine whether the selected range contains any blocks that have been previously written and/or previously accessed. In accordance with the present invention, re-striping can be skipped for blocks that are clean by returning to process 742 to select a new LBA range. Otherwise, the LBA selected LBA blocks are read in 744 and copied in 745. Copy operation 745 will result in some of the blocks being re-striped according to the RAID algorithms in operation for the particular RAID set. Copy operation 745 is followed by selecting a new LBA range in 742 until the entire logical drive has been re-striped.

Similarly, RAID migration 751 may be performed to, for example, affect a change in fault-tolerance level for the RAID set. RAID migration 751 is similar to capacity expansion operations 741, although performed for different reasons. Again, a range of blocks identified by an LBA range is selected in 752 and tested in 753 to determine if the entire LBA range is clean. When the entire LBA range is clean as indicated by the state bits of the one or more zone maps 301 and 401, the migration operations for that LBA range can be skipped by returning to operation 752 to select a new range. When the LBA range is dirty, the blocks corresponding to the LBA range are read in 754 and copied (re-striped) according to the RAID algorithms in effect for the logical drive being processed. Operations 753, 7534, 754 and 755 are repeated until the entire logical drive has been processed.

Figure 8:
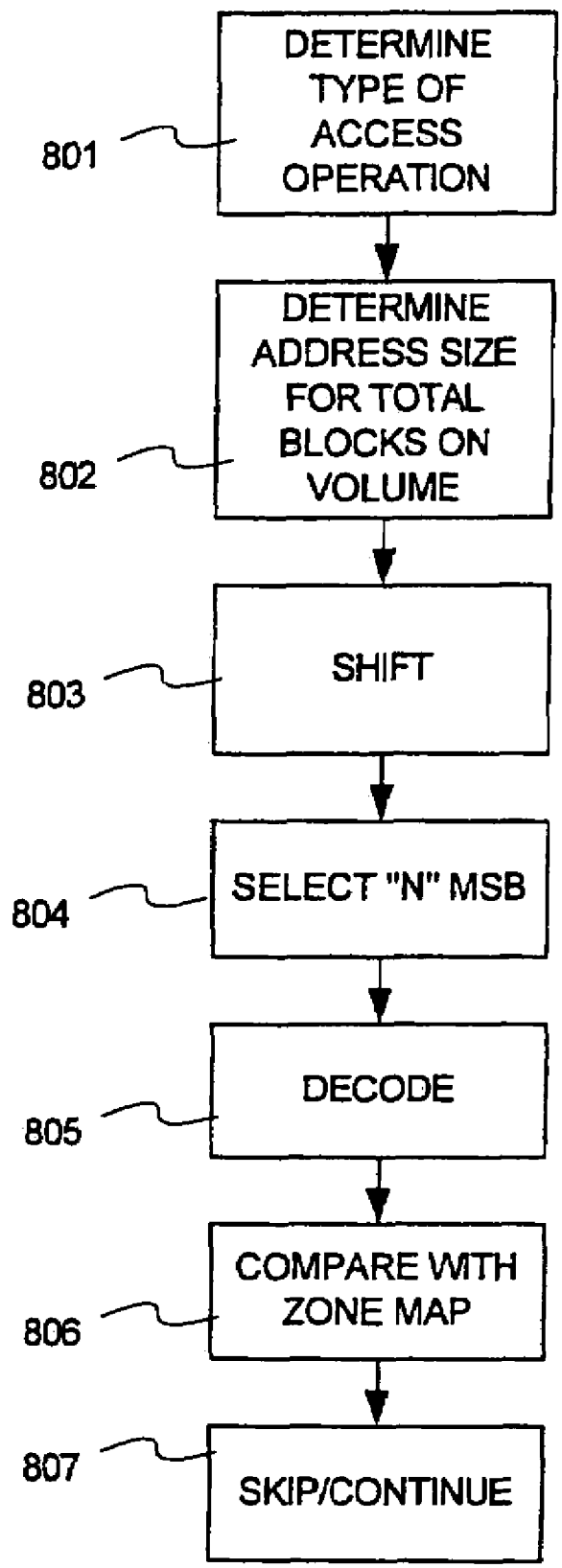
FIG. 8 illustrates operations involved in mapping storage access operations to zone maps in accordance with the present invention.

FIG. 8 illustrates some operations conducted during operations that determine whether a particular storage access request (e.g., write 711, read 721, rebuild 731, capacity expansion 741 and RAID migration 751) involve a clean or dirty zone. In 801, the type of storage access request is determined using, for example, the operation or command code associated with the access. The address size for the total number of blocks on the logical disk is determined in 802 by, for example, consulting metadata for the logical disk. Alternatively, the total number of blocks may be stored in memory of controller 122 as the value will not change often, and it may be more efficient to minimize the frequency of accesses to the metadata. In 803, the LBA specified by the access operation is shifted by a predetermined number of bits based on the total address size for the logical volume. In essence, operation 803 identifies the most significant bit of the address range actually used by the logical disk and shifts out the leading address bits that are not actually in use.

In 804, a number "N" of most significant bits of the shifted address are identified and decoded. The starting LBA and ending LBA of the operation are analyzed in this manner to in 805 to produce a bit map 207 that includes one or more bits indicating the one or more zones involved in the access operation. In 806, the bit map 207 is compared to the appropriate zone maps, and in the case of operations such as rebuild 731, capacity expansion 741, and RAID migration 751, a decision to skip the operation or proceed with the operation is made in 807. In the case of read and write operations, the appropriate zone maps are updated if changed.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method of operating a storage controller comprising:
   receiving data access requests containing a logical block address and a count of blocks involved in the access request;
   persistently storing a record indicating whether particular logical block addresses have been accessed since creation;
   in response to detecting a condition that requires an operation that accesses a logical block address range, consulting the persistently stored record as to whether the logical block address range has been previously accessed; and,
   skipping the operation when the logical block address range has not been previously accessed.

2. The method of claim 1, wherein the persistent record is stored in one or more reserved sectors of at least one disk drive in an array of disks.

3. The method of claim 1, wherein the persistent record is stored in non-volatile memory of the controller.

4. The method of claim 1, wherein the operation comprises a rebuild operation for a selected LBA (logical block address) range.

5. The method of claim 1, wherein the operation comprises a capacity expansion operation for a selected LBA (logical block address) range.

6. The method of claim 1, wherein the operation comprises a data migration operation for a selected LBA (logical block address) range.

7. The method of claim 1, wherein the act of skipping can be selectively disabled.

8. The method of claim 1, wherein the record indicates whether any of a particular range of block addresses has been previously written.

9. The method of claim 1, wherein the record indicates whether any of a particular range of block addresses has been previously read.

10. The method of claim 1 further comprising:
    defining a plurality of zones, wherein each zone comprises a range of logical block addresses;
    determining from the logical block address and count information associated with a storage access request, the identity of zones affected by the storage access request; and,
    setting a bit in the persistent record corresponding to the identified zone before completing the storage access request.

11. A storage controller comprising:
    mechanisms for handling storage access operations that specify one or more logical block addresses;
    mechanisms for accessing metadata indicating groups of logical block addresses that have been previously accessed, and comprising:
       a shift register operable to shift the at least one logical block address by a predetermined number of bits based on the size of a logical volume to which the storage access operations apply; and,
       a decoder operable on a predetermined number of the most significant bits of the shifted logical block address to generate a bit map indicating a range of logical block addresses including the at least one logical block address specified by the storage access operation; and,
    mechanisms for skipping selected storage access operations when the selected storage access operations operate on a logical block address that has not been previously accessed.

12. The storage controller of claim 11, wherein the storage access operation comprises a write operation and the mechanisms for accessing metadata further comprise:
    processes for updating the metadata to indicate that the write operation has accessed a range of logical block addresses including the logical block address specified in the write operation.

13. The storage controller of claim 11, wherein the storage access operation comprises a read operation and the mechanisms for accessing metadata further comprise:
    processes for updating the metadata to indicate that the read operation has accessed a range of logical block addresses including the logical block address specified in the read operation.

14. The storage controller of claim 11, wherein the mechanisms for accessing metadata further comprise:
    mechanisms for reading metadata stored persistently in reserved sectors of a physical disk drive.

15. The storage controller of claim 11, wherein the storage controller further comprises non-volatile memory and the mechanisms for accessing metadata further comprise:
    mechanisms for reading metadata stored persistently in the non-volatile memory.

16. The storage controller of claim 11 further comprising processes for selectively disabling the mechanisms for skipping.

17. The storage controller of claim 11 further comprising a mechanism for logically combining the bit map with the metadata to produce updated metadata.

* * * * *